United States Patent [19]

Hirome et al.

[11] Patent Number: 4,736,370
[45] Date of Patent: Apr. 5, 1988

[54] TRANSMITTING DATA PROCESSING SYSTEM

[75] Inventors: Masashi Hirome, Setagaya; Kiyotaka Shikata, Yokohama, both of Japan

[73] Assignee: Fujitsu Limited, Kawasaki, Japan

[21] Appl. No.: 827,975

[22] PCT Filed: Dec. 25, 1985

[86] PCT No.: PCT/JP85/00713

§ 371 Date: Jan. 29, 1986

§ 102(e) Date: Jan. 29, 1986

[87] PCT Pub. No.: WO86/04203

PCT Pub. Date: Jul. 17, 1986

[30] Foreign Application Priority Data

Dec. 27, 1984 [JP] Japan ................... 59-280628

[51] Int. Cl.$^4$ .............................................. H04J 3/26
[52] U.S. Cl. .................................... 370/94; 370/100
[58] Field of Search ............... 370/85, 86, 94, 100; 340/825.5, 825.05; 375/110, 114

[56] References Cited

U.S. PATENT DOCUMENTS 4,099,024  4/1978  Boggs et al. ................. 370/85
4,593,154  6/1986  Takeda et al. ................ 370/86
4,596,013  6/1986  Tashiro et al. .

FOREIGN PATENT DOCUMENTS 57-66013    4/1982  Japan .
57-173951  10/1982  Japan .

OTHER PUBLICATIONS

Pittroff et al., "Don't Forget the Physical Layer", New Electronic, vol. 17, No. 7, Apr. 1984, pp. 37, 39–41.

*Primary Examiner*—Douglas W. Olms
*Attorney, Agent, or Firm*—Staas & Halsey

[57] ABSTRACT

A transmitting data processing system used in a node of a data transmitting system, such as a local area network, applied in a wide area using a relatively long range transmission line and a plurality of the nodes on the transmission line for relaying a frame comprising a preamble pattern and transmitting data. A beginning part of the preamble is dissipated or lost in each node when a clock signal is extracted from the preamble pattern. The dissipated part is restored in the node by adding a newly generated preamble signal having a time duration being substantially equal to the time duration of the dissipated part at the beginning of the dissipated preamble pattern after sensing the dissipated preamble pattern, or by replacing the dissipated preamble pattern with a newly generated preamble pattern equal to a standard preamble pattern after sensing a carrier of the frame.

12 Claims, 8 Drawing Sheets

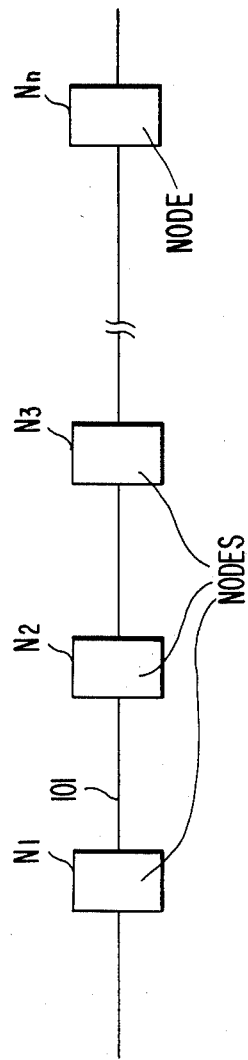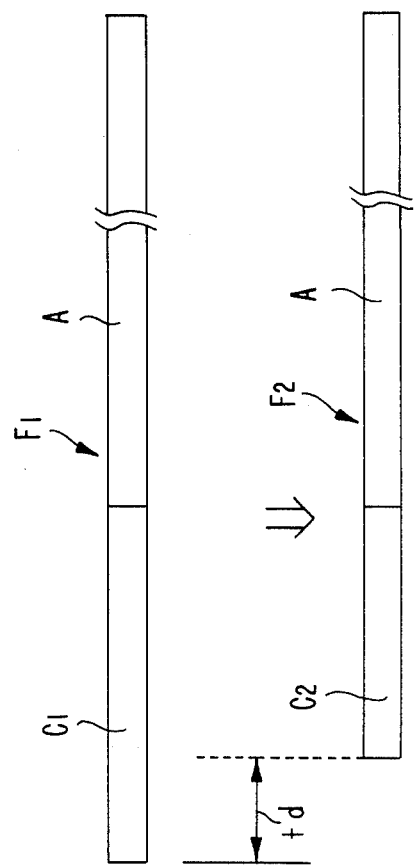
FIG. 1
FIG. 2(a) PRIOR ART
FIG. 2(b) PRIOR ART $E_1$    READ OUT $F_2$

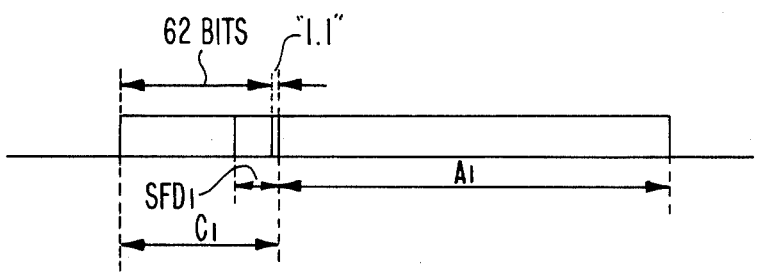
FIG. 10(a)
FIG. 10(b)
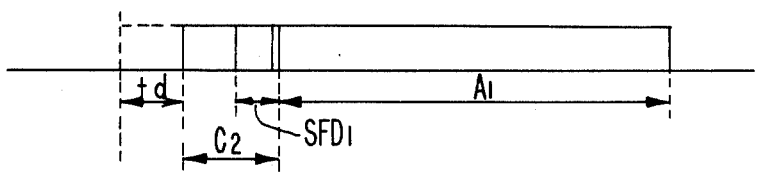
FIG. 10(c)
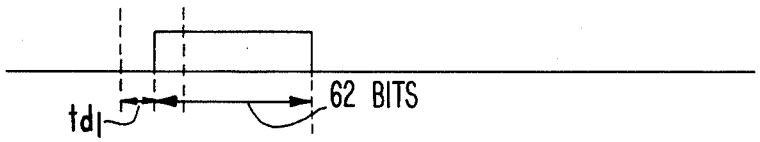
FIG. 10(d)
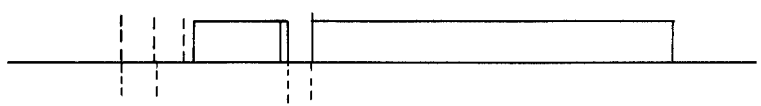
FIG. 10(e)
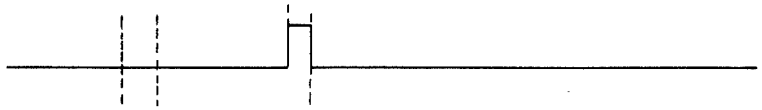
FIG. 10(f)
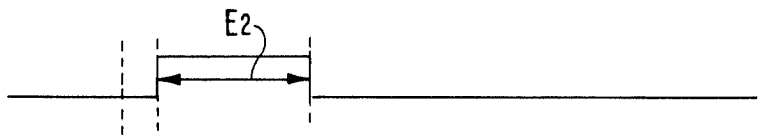
FIG. 10(g)
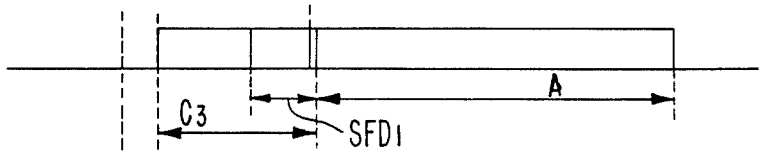

TRANSMITTING DATA PROCESSING SYSTEM

CROSS REFERENCES TO RELATED APPLICATIONS

This application is related to U.S. application having Ser. No. 758,787.

FIELD OF THE INVENTION

1. Background of the Invention

The present invention relates to a data transmission system, and particularly relates to a transmitting data processing system for transmitting data with a preamble pattern along a transmission line.

2. Description of the Related Art

In a data transmission system such as a local area network (LAN), a plurality of nodes are located along a transmission line as shown in FIG. 1. In FIG. 1, reference numeral 101 is a transmission line and reference symbols $N_1$, $N_2$, $N_3$, - - - , and $N_n$ are the nodes. A preamble pattern is added at the head or beginning of a frame (packet) of data to allow extracting a clock signal from it to relay the data through the nodes. The "Node" herein means an apparatus having the function of relaying the data to next node. The preamble pattern is defined in an IEEE Standard (draft) 802.3.

According to the IEEE Standard 802.3, the frame consists of eight fields: a field for a preamble pattern, a field for a start field delimiter (SFD), a field for a destination address, a field for a source address, a field for indicating the length of the following field, a field of logical link control (LLC) data, and others. The fields are timely arranged in the order of the above description. The preamble pattern is always positioned at the head or beginning of the frame combined with the SFD pattern. The preamble pattern consists of seven octets (56 bits) each looking like "10101010", and the SFD pattern consists of one octet (8 bits) looking like "10101011" in which the last two bits "11" indicated that the preamble pattern is finished and other data will follow after the two bits "11". Accordingly, in this disclosure, the frame will be divided into two fields for simplicity: a field for a preamble pattern consisting of eight octets (64 bits), in which each of the first seven octets is bits like 10101010 and the last octet is bits like 10101011, and a field for transmitting data which includes the address, the data to be sent, and others.

When a node receives a frame, a clock signal is extracted from the preamble pattern of the frame; the clock signal is used for reforming or recreating the received frame in the node and transmitting the reformed frame to another node. Because of the preamble pattern's character, a beginning part of the preamble pattern is dissipated during the period in which the clock signal is extracted from the preamble pattern; therefore, a minimum bit length is necessary for the preamble pattern as the IEEE standard specifies, and if the number of nodes increases, the bit-length of the preamble pattern must be more than 64 bits in an initial state. If the above was not considered, many parts of the preamble pattern would be dissipated, or lost so that the clock signal could not be extracted or even a part of the transmitting data would be dissipated at the nodes near the end of the transmission line.

Recently, the LAN system has been used in a wide area, so that the transmission line is lengthened and the number of nodes increases; accordingly, the preamble pattern must have a long bit length to maintain the IEEE standard at the nodes near the end of the transmission line, which causes a further problem in that the data transmission efficiency will be decreased because each frame has a long preamble pattern on average. If the dissipated or lost part is restored at each node, the problem can be solved and the serviceable or usable area of the data transmission system can be extended.

The dissipation of the beginning part of the preamble pattern is shown in FIG. 2. FIG. 2(a) shows a frame $F_1$ which comes from node $N_1$ and is received at node $N_2$, assume that the frame $F_1$ includes a standard preamble pattern hereinafter. FIG. 2(b) shows a frame $F_2$ sent from node $N_2$ to node $N_3$. The frame $F_1$ is composed of a preamble pattern $C_1$ and transmitting data A, and a clock signal is extracted from preamble pattern $C_1$ at node $N_2$ wasting time called as a delay time $t_d$, so that a beginning part of the preamble pattern $C_1$ is dissipated at node $N_2$ producing preamble pattern $C_2$ whose bit-length is shorter than that of frame $C_1$ by as much as the delay time $t_d$. Therefore, when the frame is sent through a plurality of nodes, many portions of the preamble pattern will be dissipated, or lost so that there is possibility that the clock signal cannot be extracted at succeeding nodes and sometimes even beginning part of transmitting data A will be dissipated. Accordingly, a preamble pattern initially must have a long bit length as mentioned above.

FIG. 3 shows a block diagram of the prior art transmitting data processing system. In FIG. 3, a reference numeral 1 is a receiving unit which receives frame $F_1$ from node $N_1$ through the transmission line; reference numeral 2 is a transmitting unit from which frame $F_2$ is sent out to the transmission line. Reference numeral 3 is a clock extracting circuit in which a clock signal is extracted from preamble pattern $C_1$ of frame $F_1$. The frame $F_1$ is fed to a flip-flop circuit 4 and reformed or recreated as frame $F_2$ using the clock signal from clock extracting circuit 3. The bit-length of preamble pattern $C_2$ becomes shorter than that of preamble pattern $C_1$ because of the dissipation or loss which occurs in extracting the clock signal from preamble pattern $C_1$. If frame $F_1$ is to be relayed to another node, the frame $F_2$ is fed to a flip-flop circuit 6 in transmitting unit 2 with the clock signal and the frame $F_2$ passes through a selector 5 in which additional data can be added to data A if necessary. If the destination of frame $F_1$ is node $N_2$ itself, the selector 5 rejects will not pass transmitting data A, and data A and the clock signal are fed out to a node terminal which is not depicted in FIG. 3. Thus, in the prior art, each node dissipates or loses at beginning part of the preamble pattern, which produces the problem of decreasing the data transmission efficiency as mentioned above.

DISCLOSURE OF THE INVENTION

An object of the present invention is to restore the dissipated or lost preamble pattern to a normal preamble pattern at each node.

Another object of the present invention is to extend the serviceable area of the data transmission system with the limitation that the bit-length of the preamble pattern should be more than a fixed value.

Yet another object of the present invention is to increase the number of usable nodes in the data transmission system with the limitation that the bit-length of the preamble pattern should be more than a fixed value.

A further object of the present invention is to increase the data transmitting efficiency of the data transmission system.

The above objects are achieved by automatically supplementing the dissipated or lost part of the preamble pattern or automatically replacing the dissipated preamble pattern with a newly generated preamble pattern at each node. Thus, the restoration is made by two means. The first is a device for adding a newly generated or supplemental preamble signal to the dissipated preamble pattern after an enable signal for the clock signal is obtained. The bit length of the added preamble signal can be made to be substantially equal to the dissipated part. The other is a device for replacing the dissipated preamble pattern with a newly generated preamble pattern which has a standard bit length after a carrier of the received frame is sensed. The former device is created by applying a timing circuit, a buffer memory, a preamble pattern generator, and a mixing circuit to the prior art transmitting data processing system. The later device is created by applying the same circuits as in the former means along with a carrier sense circuit.

BRIEF DESCRIPTION OF THE DRAWINGS

FIG. 1 is a schematic illustration of a data transmission system;

FIG. 2(a) is an illustration of frame $F_1$ received at node $N_1$;

FIG. 2(b) is an illustration of frame $F_2$ obtained at node $N_2$ after extracting a clock signal from frame $F_1$;

FIG. 10(a) is a time chart for frame $F_1$;

FIG. 10(b) is a time chart for frame $F_2$;

FIG. 10(c) is a time chart for a 62-bit gate signal;

FIG. 10(d) is a time chart for an output of buffer memory 7;

FIG. 10(e) is a time chart for a prohibition signal;

FIG. 10(f) is a time chart for a newly generated preamble pattern; and

FIG. 10(g) is a time chart for frame $F_3$.

DESCRIPTION OF THE PREFERRED EMBODIMENTS

Figure 5A:
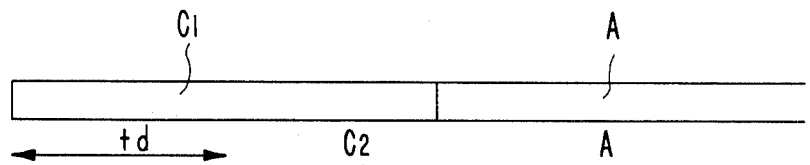
FIG. 5(a) is a time chart for frame $F_1$.
Figure 5B:
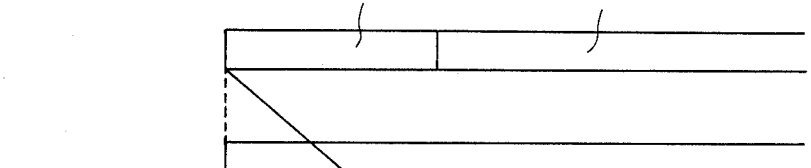
FIG. 5(b) is a time chart for frame $F_2$.
Figure 5C:
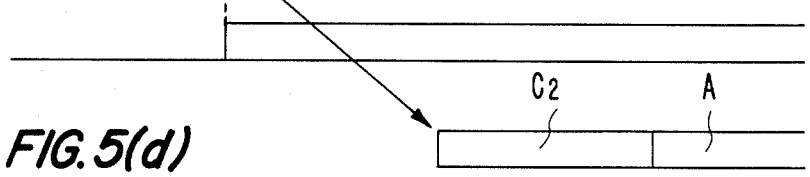
FIG. 5(c) is a time chart for clock extraction.
Figure 5D:
FIG. 5(d) is a time chart for a signal read out from a buffer memory.
Figure 4:
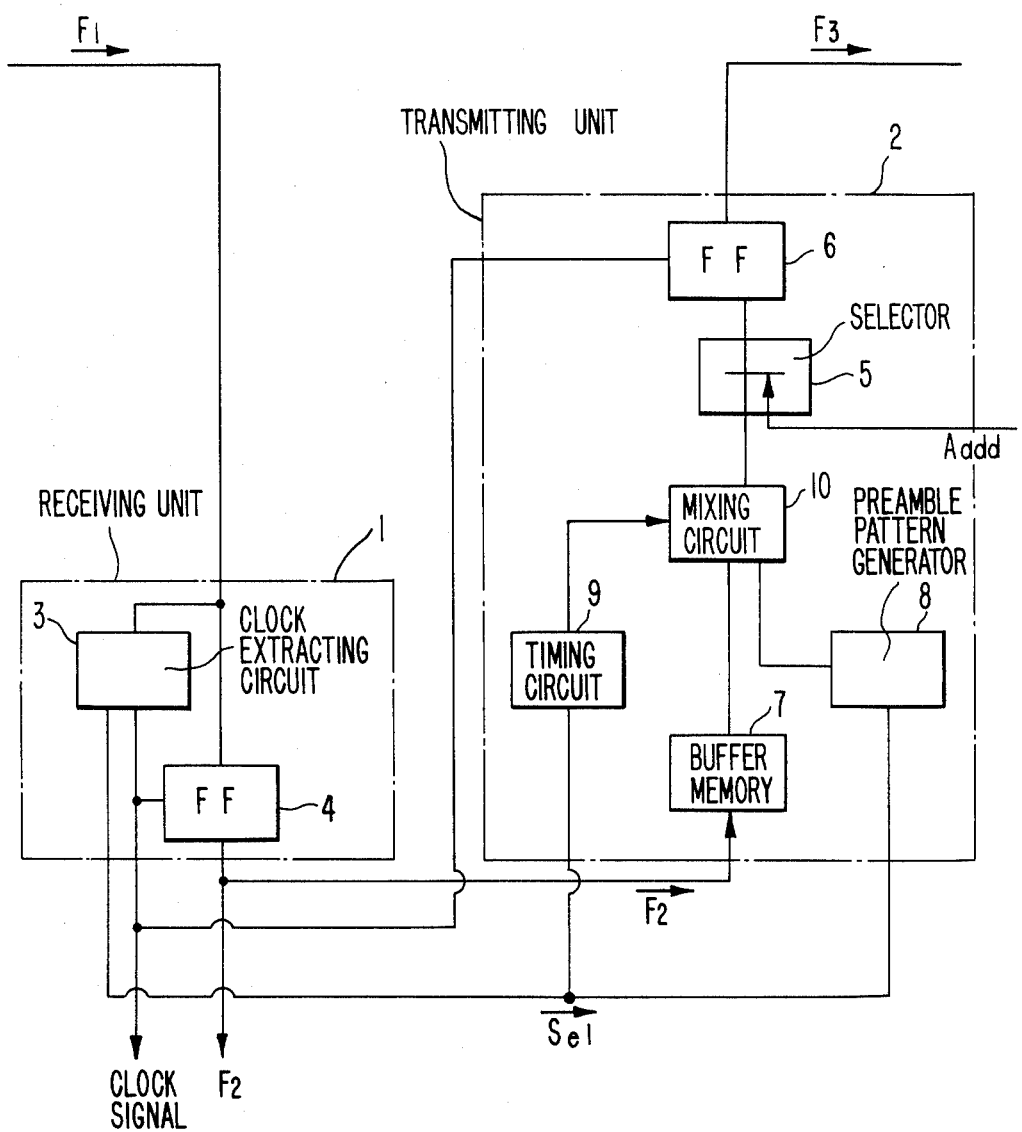
FIG. 4 is a block diagram of the first embodiment of the present invention.

FIG. 4 is a block diagram of the transmitting data processing system of the first embodiment of the present invention; FIG. 5 is a time chart for explaining the function of FIG. 4; FIG. 6 is a block diagram of transmitting unit 1 in FIG. 4; and FIG. 7 is a time chart for explaining the function of FIG. 6.

Figure 3:
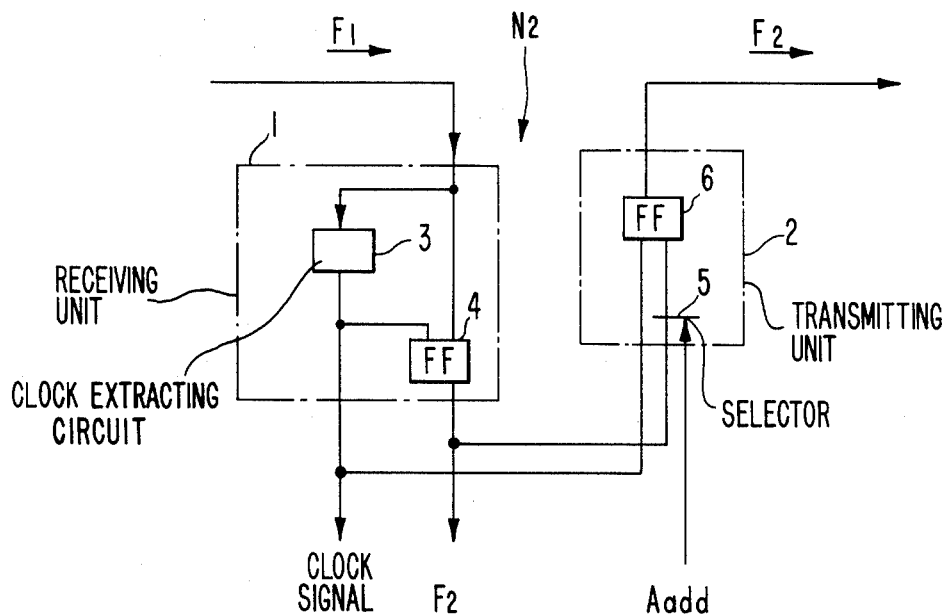
FIG. 3 is a block diagram of the prior art transmitting data processing system.

In FIG. 4, the blocks having the same reference numerals as in FIG. 3 have the same function as in FIG. 3. FIG. 4 shows the block diagram of node $N_2$ for example where the new block diagram is obtained by adding a buffer memory 7, a preamble pattern generator 8, a timing circuit 9, and a mixing circuit 10 to the block diagram of the prior art transmitting data processing system shown in FIG. 3.

When receiving unit 1 receives frame $F_1$, a clock signal is extracted from preamble pattern $C_1$ by clock extracting circuit 3; accordingly. When frame $F_1$ is reformed or recreated as frame $F_2$ in flip-flop circuit 4, the bit length of preamble pattern $C_2$ in frame $F_2$ becomes shorter than that of preamble pattern $C_1$; that is, a beginning part of preamble pattern $C_1$ is dissipated or lost by extracting the clock signal from preamble pattern $C_1$ during a delay time $t_d$ as shown in FIGS. 5(a) and 5(b). The frame $F_2$, reformed by flip-flop circuit 4, is sent to buffer memory 7, and at the same time, an enable signal $S_{e1}$ produced in clock extracting circuit 3 is sent to a timing circuit 9 and a preamble signal generator 8 in transmitting unit 2 as shown in FIG. 4. The enable signal $S_{e1}$ is a signal which supplies positive proof of the existence of frame $F_2$ as long as the level of enable signal $S_{e1}$ is, for example, high as shown in FIG. 5(c).

Figure 5E:
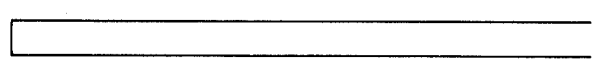
FIG. 5(e) is a time chart for a generated preamble signal.
Figure 5F:
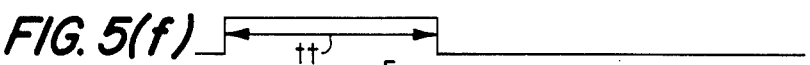
FIG. 5(f) is a time chart for a timing signal.
Figure 5G:
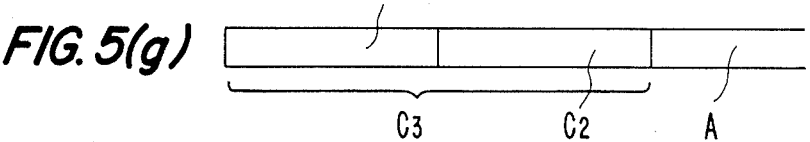
FIG. 5(g) is a time chart for frame $F_3$.
Figure 6:
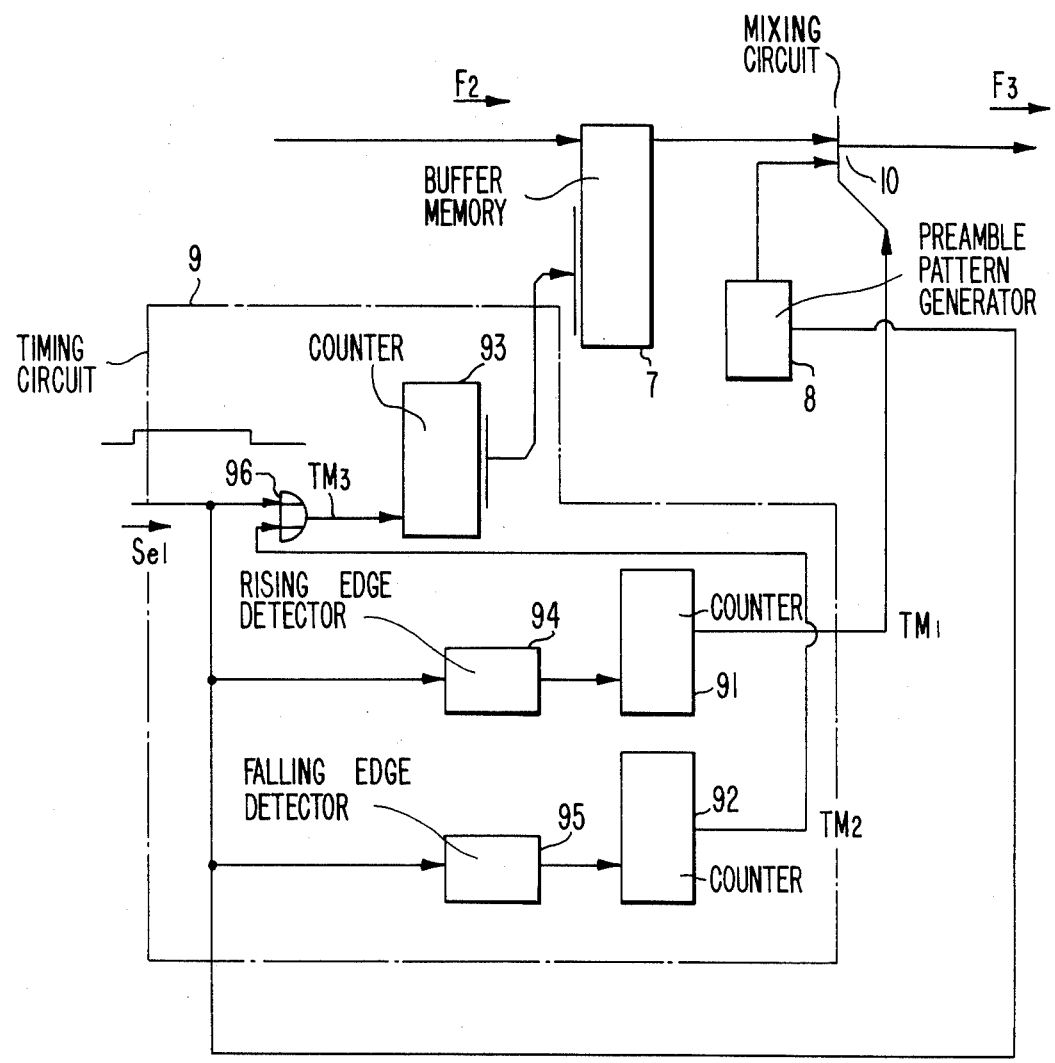
FIG. 6 is a block diagram of transmitting unit 1 in FIG. 4.

When preamble signal generator 8 receives enable signal $S_{e1}$, a preamble signal is newly generated as shown in FIG. 5(e). In mixing circuit 10, the data of frame $F_2$ stored in buffer memory 7 and a part of the newly generated preamble signal are combined under the control of timing circuit 9. In the data transmitting system, generally, the delay time $t_d$ can be previously estimated, so that the time duration $t_t$, during which the generated new preamble signal is selected by mixing circuit 10, can be provided in the timing circuit 9 to be substantially equal to delay time $t_d$ as shown in FIG. 5(f). Therefore, if the stored data of frame $F_2$ are read from buffer memory 7 just after timing duration $t_t$ is over, the dissipated part of the preamble pattern can be supplemented as shown in FIG. 5(g). FIG. 5(g) shows a frame $F_3$ which is an output frame from mixing circuit 10 and is to be sent from transmitting unit 2. In frame $F_3$, reference symbol E is newly added preamble signal which includes preamble pattern $C_2$ combined with preamble pattern $C_2$ where preamble pattern $C_2$ and transmitting data A are what is read out from buffer memory 7.

FIG. 6 shows a more detailed block diagram of transmitting unit 2, particularly a block diagram related to the timing operation for combining the newly generated preamble pattern with frame $F_2$. In FIG. 6, the blocks having the same reference numerals as in FIG. 4 have the same function as in FIG. 4. FIG. 7 is a time chart for explaining FIG. 6.

Figure 7A:
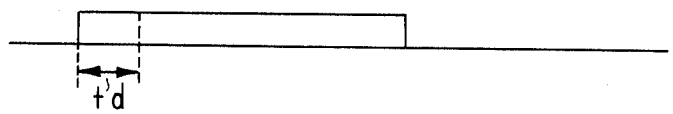
FIGS. 7(a) to 7(j) are time charts for explaining the function of FIG. 6.
Figure 7B:
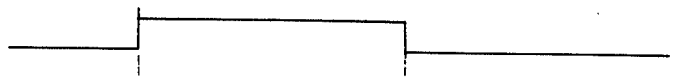
Figure 7C:
Figure 7D:
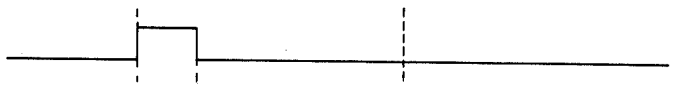
Figure 7E:
Figure 7F:
Figure 7G:
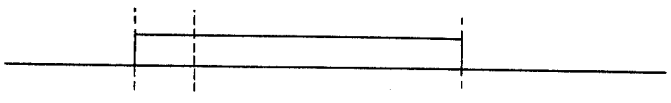

When frame $F_2$ arrives at buffer memory 7 as shown in FIG. 7(b), enable signal $S_{e1}$, which is in a high (H) level as shown in FIG. 7(c), is simultaneously applied to an OR circuit 96, so that OR circuit 96 produces an H level signal for a timing signal $TM_3$ shown in FIG. 7(f) where FIG. 7(a) shows frame $F_1$ for comparing with frame $F_2$ shown in FIG. 7(b). The timing signal $TM_3$ is applied to a counter 93 in which an access address signal shown in FIG. 7(g) is provided and sent to buffer memory 7. When buffer memory 7 receives the access address signal, the data are stored into and read out from buffer memory 7. The buffer memory 7 is a ring type, so that the data (frame $F_2$) stored therein are automatically read out after "one ring cycle" is over. In the embodiment, the period of the ring cycle is significant to determine the duration for adding the newly generated preamble signal for supplementing the dissipated part of the preamble pattern, which will be clear in the following discussion. The period of the ring cycle generally relates to memory capacity, for example, when buffer memory 7 has memory capacity of one mega byte, the period is approximately 410 micro-sec.

Figure 7H:
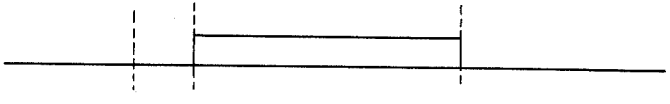
Figure 7I:
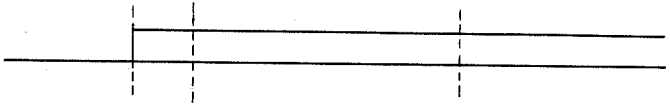
Figure 7J:
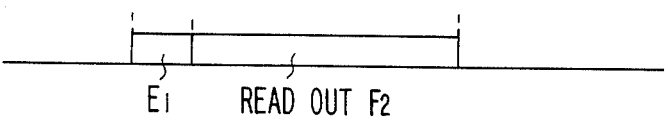

The enable signal $S_{e1}$ is also applied to the preamble signal generator 8, a counter 91 through a level change or rising edge detector 94, and a counter 92 through a level change or falling edge detector 95. When enable signal $S_{e1}$ is applied to preamble signal generator 8, a new preamble signal is generated as shown in FIG. 7(i) and a part ($E_1$) of it is applied to mixing circuit 10 only during the duration of a timing signal $TM_1$ shown in FIG. 7(d). The timing signal $TM_1$ is provided as follows: when rising edge detector 94 detects the rising level change of the enable signal $S_{e1}$, counter 91 produces timing signal $TM_1$ and applies it to mixing circuit 10; the duration of timing signal $TM_1$ is determined to be equal to the period of the ring cycle. Next, when falling level change detector 95 detects the falling level change of the enable signal $S_{e1}$, counter 92 produces a timing signal $TM_2$ shown in FIG. 7(e), and it is applied to OR circuit 96; the duration of timing signal $TM_2$ is determined to also be equal to the period of the ring cycle. Accordingly, the duration of timing signal $TM_3$ is equal to the sum of the duration of timing signal $TM_2$ and enable signal $S_{e1}$ as shown in FIG. 7(f), so that counter 93 produces an access address signal during a duration equal to that of time duration $TM_3$, which means that the newly generated preamble signal is first applied to mixing circuit 10 from preamble signal generator 8, and the frame $F_2$'s data stored in buffer memory 7 are read out and applied during time between the point where timing signal $TM_1$ is over and the point where timing signal $TM_2$ is over as shown in FIG. 7(h). Therefore, mixing circuit 10 produces frame $F_3$ as shown in FIG. 7(j). In FIG. 7(j), reference symbol $E_1$ is the part of the newly generated preamble signal which is added to frame $F_2$'s data.

As can be seen a comparison of FIGS. 7(a) and 7(j), according to the above embodiment, there is a time lag of delay time $t_d$ between the start points of frame $F_1$ and frame $F_3$, which causes decrease in the data transmission efficiency, and furthermore, the bit-length of preamble pattern $C_3$ is not exactly set to be equal to the bit-length (64 bits) of the IEEE standard. To improve on this situation, another embodiment will be discussed referring to FIGS. 8, 9, and 10.

Figure 8:
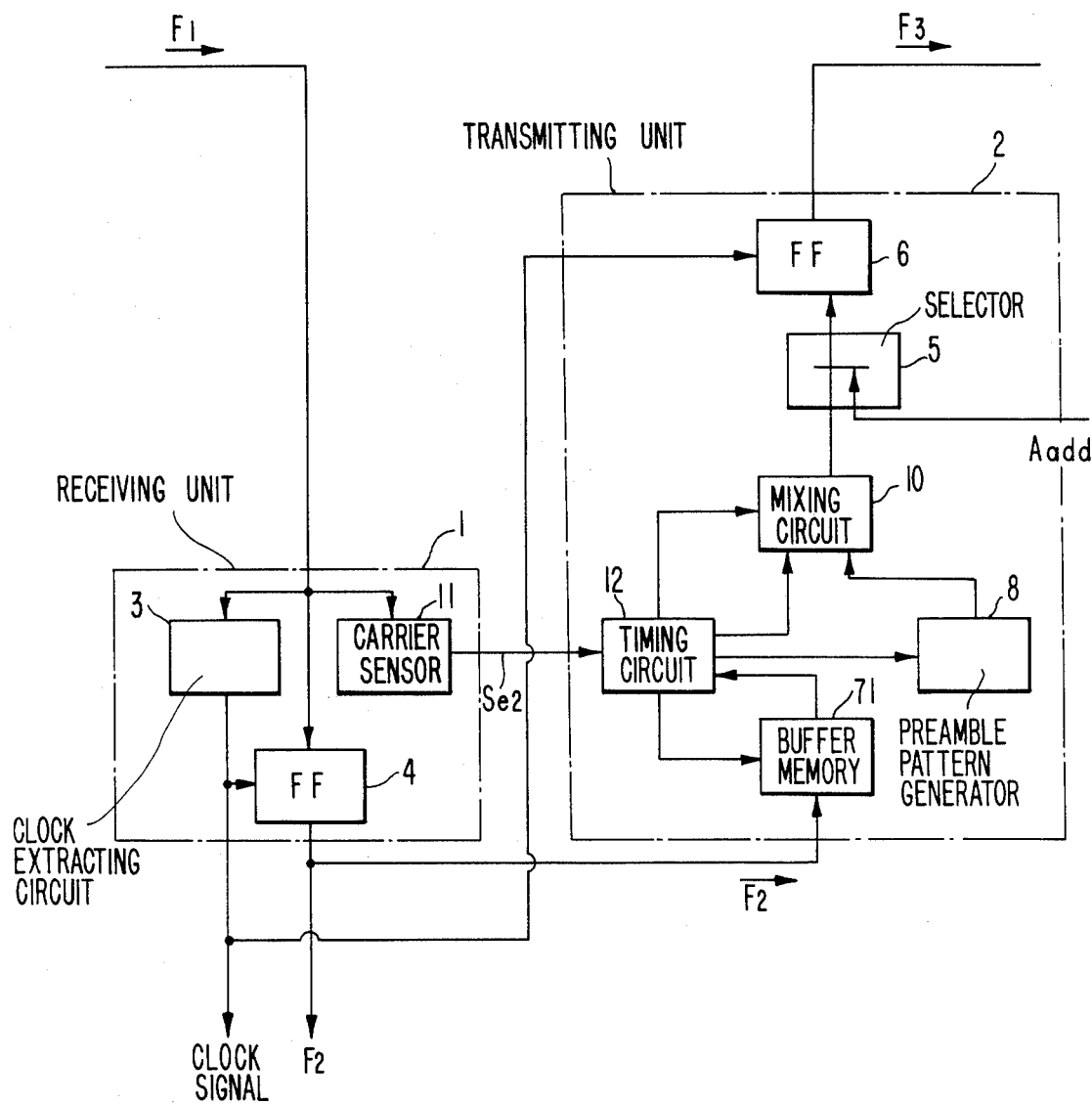
FIG. 8 is a block diagram of a second embodiment of the present invention.
Figure 9:
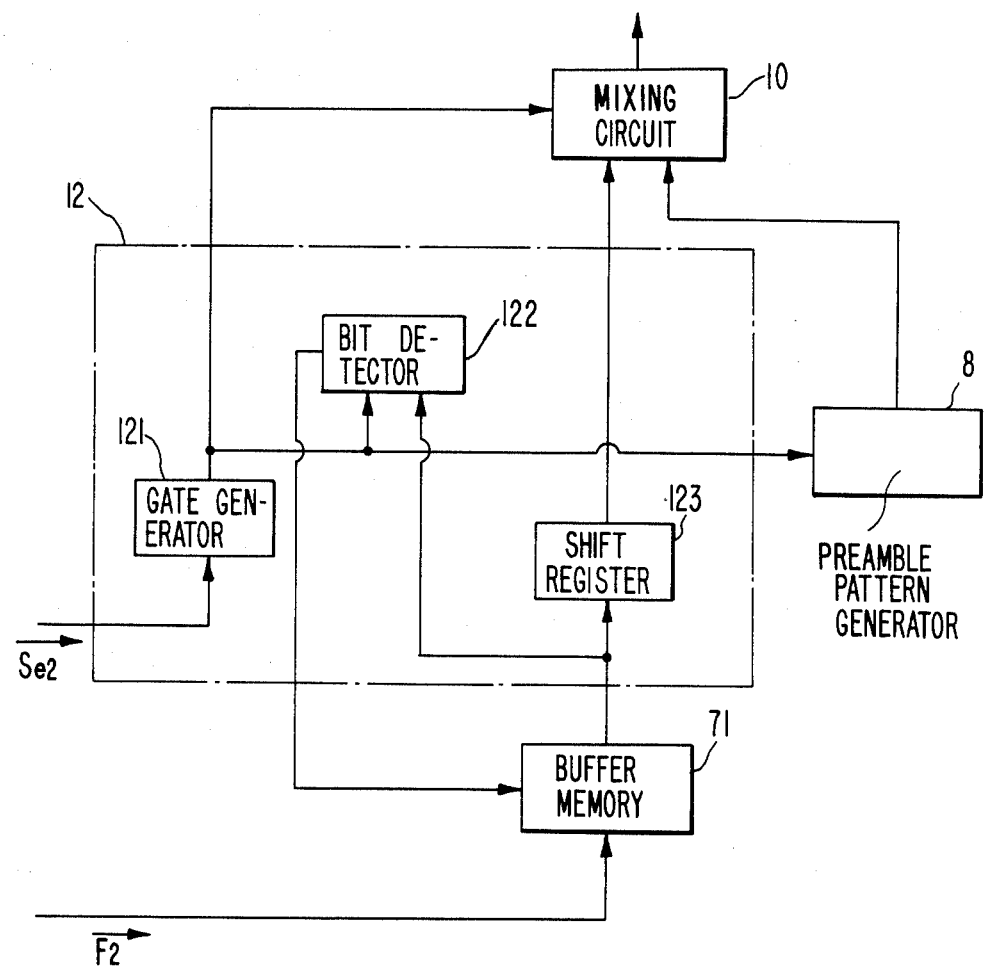
FIG. 9 is a block diagram of a transmitting unit in FIG. 8.

FIG. 8 is a block diagram of the transmitting data processing system of a second embodiment of the present invention; FIG. 9 is a block diagram in transmitting unit 2 in FIG. 8; and FIG. 10 is a time chart for explaining the function of FIG. 9.

In FIG. 8, the blocks having the same reference numerals and symbols as in FIG. 4 have the same function as in FIG. 4. In this embodiment, a carrier sensor 11 is added in receiving unit 1 for sensing the carrier of received frame $F_1$. When receiving unit 1 receives frame $F_1$, the carrier sensor 11 senses the carrier of frame $F_1$ and produces an enable signal $S_{e2}$ which is applied to timing circuit 12. Other circuits in receiving unit 1 in FIG. 8 function as follows: the clock extracting circuit 3 extracts the clock signal from preamble pattern $C_1$ of frame $F_1$ and applies the clock signal to flip-flop circuit 4 in which frame $F_1$ is reformed to frame $F_2$ which is applied to buffer memory 71.

The timing circuit 12 in transmitting unit 2 is included in FIG. 8; however, the function of timing circuit 12 is quite different from timing circuit 9 in FIG. 4 or 6. FIG. 9 is a block diagram of timing circuit 12 with other circuits related to the timing circuit 12. In FIG. 9, the blocks having the same reference numerals and symbols as in FIG. 8 have the same function as in FIG. 8. The enable signal $S_{e2}$ is fed to a 62-bit gate generator 121 in timing circuit 12. The 62-bit gate generator 121 produces a 62-bit gate signal having a bit length of 62 bits. The 62-bit gate signal is applied to the following circuits: the preamble signal generator 8, a 1,1-bit detector 122 in timing circuit 12, and the mixing circuit 10. When preamble signal generator 8 receives the 62-bit gate signal, the preamble signal generator 8 produces a preamble pattern having a bit length of 62 bits that looks like 10101010—10 and applies it to mixing circuit 10. The buffer memory 71 is a first in first out (FIFO) type, and when buffer memory 71 stores frame $F_2$, the stored frame $F_2$ is simultaneously read out and applied to a 1,1-bit detector 122 and a 2-bit shift register 123. The 1,1-bit detector 122 detects bit signals "1,1" from read from frame $F_2$ where the bit signals "1,1" are the last two bits of the preamble pattern $C_2$ in frame $F_2$, and produces a prohibition signal to send to buffer memory 71. When buffer memory 71 receives the prohibition signal, buffer memory 71 stops the reading operation. The 2-bit shift register 123 is for holding the remaining or last two bits of its input and the last two bits correspond to bit signals "1,1" at this time. The 62-bit gate signal applied to mixing circuit 10 controls mixing circuit 10 so that only the 62-bit preamble pattern generated by preamble signal generator 8 is selected and an output signal from 2-bit shift register 123 is selected after the 62-bit gate signal is over. When the 62-bit gate signal applied to 1,1-bit detector 122 is finished, the detector 122 controls buffer memory 71 so as to start to read out of the rest or remainder of stored frame $F_2$. The remainder is the transmitting data A in frame $F_2$. The, read out output, that is, transmitting data A from buffer memory 71, is sent to 2-bit shift register 123. Therefore, from 2-bit shift register 123, the remaining bit signals "1,1" are first fed to mixing circuit 10 and then transmitting data A are fed to mixing circuit 10.

FIG. 10 is a time chart for explaining the above discussion. FIG. 10(a) shows frame $F_1$ received by receiving unit 1 where the frame $F_1$ is a standard frame so that preamble pattern $C_1$ has a 64 bit length which includes the SFD pattern in which 2 bits of "1,1" exist. FIG. 10(b) shows frame $F_2$ fed to buffer memory 71 where the shadowed portion in FIG. 10(b) corresponds to the dissipated or lost part of preamble pattern $C_1$ and where the bit length of the dissipated part is equal to the time delay $t_d$. FIG. 10(c) shows the 62-bit gate signal which is obtained by enable signal $S_{e2}$; however, a time lag between the leading edges of the carrier of frame $F_1$ and enable signal $S_{e2}$ occurs when carrier sensing circuit 11 produces enable signal $S_{e2}$. Therefore, there is a time delay $t_{d1}$ between the leading edge of frame $F_1$ and the 62-bit gate signal as shown in FIG. 10(c). The amount of delay time $t_{d1}$ is more than two bits but less than the amount of delay time $t_d$. FIG. 10(d) shows the output of buffer memory 71 where each datum of the output is read out every after the datum is written into; however, the read out operation stops when the bit signals "1,1" are detected by 1,1-bit detector 122 and the prohibition signal, which is shown in FIG. 10(e), is applied to buffer memory 71. The buffer memory 71 starts to read out the stored data again when the 62-bit gate signal is over. FIG. 10(f) shows a preamble pattern $E_2$ which is newly generated by preamble signal generator 8 when the 62-bit gate signal is input to preamble signal generator 8 as shown in FIG. 10(c). FIG. 10(g) shows frame $F_3$ which is produced from mixing circuit 10 by selecting the newly generated preamble pattern $E_2$ shown in FIG. 10(f), the bit signals "1,1", and transmitting data A; the bit signals "1,1" and transmitting data A are provided from 2-bit shift register 99.

Comparing FIG. 10(g) with FIG. 5(g), delay time $t_{d1}$ is less than delay time $t_d$; and accordingly, the later embodiment is better than the former as to the data transmitting efficiency. Furthermore, in the later embodiment, a preamble pattern (preamble pattern $C_3$) can be provided that is exactly equal to the length of the IEEE standard.

We claim:

1. A transmit data processing system for relaying transmit data with a preamble pattern through a plurality of nodes located along a transmission line, said transmit data processing system, in one of nodes, comprising:
   means for receiving a first frame comprising a first preamble pattern, having a bit length, and the transmit data;
   means for extracting a clock signal from said first preamble pattern, thereby extracting a beginning part of said first preamble pattern;
   means for producing said first frame as a second frame using said clock signal, said second frame comprising a second preamble pattern followed by said transmit data, said second preamble pattern having a bit length shorter than the bit length of said first preamble pattern by the length of said extracted beginning part;
   means for forming a created preamble pattern equal to the first preamble pattern from the second preamble
   means for producing a restored frame comprising said created preamble pattern followed by said transmit data; and
   means for sending said restored frame from said node.

2. A transmit data processing system according to claim 1, wherein said means for producing the restored frame comprises means for forming said restored frame equal to the first frame which restored frame comprises said created preamble pattern created equal to the first preamble pattern and said transmit data.

3. A transmit data processing system according to claim 2, further comprising enable signal means for producing an enable signal which provides proof of the existence of said second frame.

4. A transmit data processing system according to claim 3, wherein said means for supplementing said extracted part and said means for producing said restored frame comprise:
   a buffer memory, operatively connected to said means for receiving, for storing said second frame and automatically reading out said stored second frame when a first period is over after said buffer memory has begun to store said second frame;
   a preamble signal generator for generating a generated preamble signal when said enable signal is applied thereto;
   a mixing circuit, operatively connected to said preamble signal generator, said buffer memory and said means for sending, for producing said restored frame by selecting said generated preamble signal and said stored second frame read out from said buffer memory; and
   a timing circuit, operatively connected to said mixing circuit, for controlling said buffer memory to store said second frame and said mixing circuit to select said generated preamble signal during said first period.

5. A transmit data processing system according to claim 4, wherein said timing circuit comprises:
   a first counter, operatively connected to said enable signal means, for generating a first timing gate signal which controls said mixing circuit to select said generated preamble signal, said first timing gate signal being generated after a leading edge of said enable signal is detected and has a time duration equal to said first period;
   a second counter, operatively connected to said enable signal means, for generating a second timing gate signal, said second timing gate signal being generated after a trailing edge of said enable signal is detected and having a time duration equal to said first period;
   an OR circuit, operatively connected to said enable signal means and said second counter, for producing a third timing gate signal by receiving said first enable signal and said second timing gate signal, said third timing gate signal having a time duration equal to a sum of the time duration of said enable signal and said second timing gate signal; and
   a third counter, operatively connected to said enable signal means and said mixing circuit, for providing an access address signal to said buffer memory upon receiving said third timing gate signal.

6. A transmit data processing system according to claim 1, further comprising:
   means for sensing a carrier in said first frame; and
   enable signal means for producing an enable signal which provides proof of the existence of said carrier.

7. A transmit data processing system according to claim 6, wherein said means for forming comprises means for producing said created preamble pattern having a standard bit length in synchronization with said second enable signal, said created preamble pattern comprising eight octets the first seven octets being 10101010 and the last octet being 10101011 from the beginning of said created preamble pattern.

8. A transmit data processing system according to claim 7, wherein said means for producing the restored frame comprises, means for forming said restored frame by adding said created preamble pattern to said transmit data.

9. A transmit data processing system according to claim 6, wherein said means for forming said created preamble pattern and said means for producing said restored frame comprise:
   a buffer memory, operatively connected to said means for receiving, for storing said second frame and automatically and substantially simultaneously reading out said second frame;
   a 62-bit gate generator, operatively connected to said enable means, for generating a 62-bit gate signal having a time duration of 62 bits upon receiving said enable signal;

a preamble signal generator, operatively connected to said 62 bit gate generator, for generating a 62-bit preamble pattern upon receiving said 62-bit gate signal, said 62-bit preamble pattern consisting of said eight octets where the last two bits are 1,1 in said last octet;

a 1,1-bit detector, operatively connected to said 62-bit gate generator and said buffer memory, for detecting bits 1,1 read out of said second frame from said buffer memory while said 62-bit gate signal is applied, and sending a prohibition signal to said buffer memory to stop the reading operation of said buffer memory until said 62-bit gate signal is finished;

a 2-bit shift register, operatively connected to said buffer memory, for holding said last two bits 1,1 read out of said second frame from said buffer memory, and sending said last two bits 1,1 and said transmit data stored in said buffer memory when said transmit data are applied thereto from said buffer memory; and a mixing circuit, operatively connected to said 62-bit gate generator, said 2-bit shift register and said preamble signal generator, for forming said restored frame by selecting first said 62-bit preamble pattern produced by said preamble signal generator and second said last two bits 1,1 and said transmit data, said last two bits 1,1 and said transmit data being applied from said 2-bit shift register, under control of said 62-bit gate signal, said 62-bit preamble pattern and said last two bits 1,1 forming said created preamble 10. A data retransmit unit for retransmitting a data frame including a preamble field and a data field, said unit comprising:

receiving means for receiving the data frame and recovering a clock signal from the preamble field during which an original length of the preamble field becomes a reduced length resulting in a reduced preamble;

restoring means for creating a supplemental preamble equal in length to the difference between the original length and the reduced length and for combining the supplemental preamble, the reduced preamble and the data field to form a restored data frame; and transmit means for transmitting the restored data frame using the clock signal.

11. A data transmit unit as recited in claim 10, where said restoring means comprises:

supplemental preamble means for creating a supplemental preamble equal in length to the difference between the original length and the reduced length; and combining means for combining the supplemental preamble, the reduced preamble and the data field.

12. A data trasnsmit unit as recited in claim 10, wherein said restoring means comprises:

new preamble generation means for generating a new preamble field having the original length; and combining means for combining the new preamble field with the data field.

* * * * *

UNITED STATES PATENT AND TRADEMARK OFFICE
CERTIFICATE OF CORRECTION

PATENT NO. : 4,736,370

DATED : April 5, 1988

INVENTOR(S) : Masashi Hirome and Kiyotaka Shikata

It is certified that error appears in the above-identified patent and that said Letters Patent is hereby corrected as shown below:

A portion of Fig. 10(b) should be hatched as illustrated below:

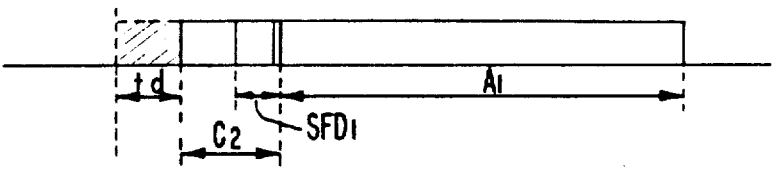

FIG. 10(b)

Signed and Sealed this

Sixteenth Day of August, 1988

Attest:

DONALD J. QUIGG

Attesting Officer

Commissioner of Patents and Trademarks